United States Patent [19]

Compton

[11] Patent Number: 5,452,109
[45] Date of Patent: Sep. 19, 1995

[54] DIGITAL IMAGE SIGNAL PROCESSING APPARATUS AND METHOD FOR ACCUMULATING BLOCKS OF SIGNAL DATA FROM AN IMAGER

[75] Inventor: John T. Compton, LeRoy, N.Y.

[73] Assignee: Eastman Kodak Company, Rochester, N.Y.

[21] Appl. No.: 298,883

[22] Filed: Aug. 31, 1994

[51] Int. Cl.⁶ .................. H04N 1/03; H04N 1/191
[52] U.S. Cl. ........................ 358/482; 358/483; 358/494; 250/208.1; 348/294; 348/295; 348/297; 348/298; 348/324
[58] Field of Search ............... 358/483, 482, 494, 471, 358/443, 445, 444, 447, 513, 514; 250/208.1; 348/294, 295, 297, 298, 324

[56] References Cited

U.S. PATENT DOCUMENTS

| | | | |
|---|---|---|---|
| 4,485,399 | 11/1984 | Schulz et al. | |
| 5,041,912 | 8/1991 | Schlig et al. | 358/295 |
| 5,047,861 | 9/1991 | Houchin et al. | |
| 5,070,414 | 12/1991 | Tsutsumi | 358/482 |
| 5,134,503 | 7/1992 | Kimura | 358/447 |
| 5,182,657 | 1/1993 | Sato et al. | 358/483 |
| 5,235,432 | 8/1993 | Creedon et al. | 358/479 |
| 5,245,444 | 9/1993 | Hashimoto | 358/445 |
| 5,252,818 | 10/1993 | Gerlach et al. | 250/208.1 |

*Primary Examiner*—Scott A. Rogers
*Attorney, Agent, or Firm*—Francis H. Boos

[57] ABSTRACT

A CCD linear imager signal processor is dynamically controlled on a pixel-by-pixel and line-by-line basis by means of programmably variable control word bit maps to control the number of range and size of blocks of imaging pixel data that are accumulated to vary the imaging resolution and the format of the imaging process.

5 Claims, 2 Drawing Sheets

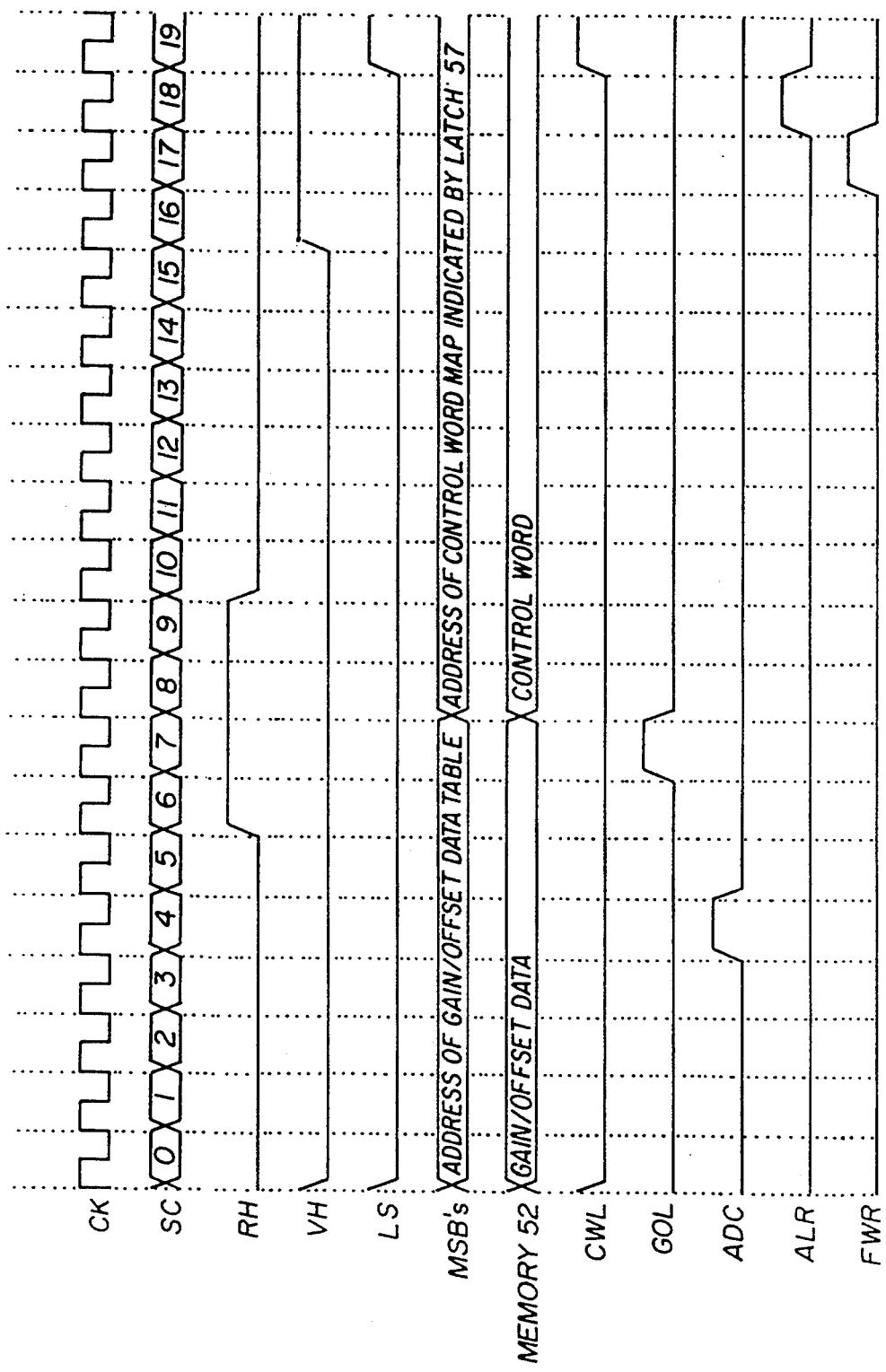

DIGITAL IMAGE SIGNAL PROCESSING APPARATUS AND METHOD FOR ACCUMULATING BLOCKS OF SIGNAL DATA FROM AN IMAGER

CROSS-REFERENCE TO RELATED APPLICATION(S)

Reference is made to commonly assigned copending application Ser. No. No. 08/298,725, entitled APPARATUS AND METHOD FOR CONTROLLING A LINEAR IMAGING DEVICE and filed concurrently herewith in the name of J. T. Compton.

1. Field of the Invention

This invention relates generally to the field of film scanners employing linear imaging devices and, in particular, to apparatus and method for grouping pixel data in the scanner signal processing circuits.

2. Background of the Invention

A charge coupled device (CCD) imager contains an array of light detecting sites which accumulate charge depending on the light energy projected onto them. After some charge accumulation time, the charges in the light detecting sites are transferred to a charge shifting structure so that the charges may be shifted out of the CCD and measured by circuit means in order to form a signal representative of the image projected onto the CCD. Typically, the measurement process involves conversion of the analog signal from the CCD to digital data. In some applications, the full resolution of the imager is not needed and, in this case, it is desirable to average a number of adjacent pixels to reduce the resolution. This can be done in software using a programmable computer. However, software employed in a high speed computer may not be able to keep up with the data rates typically encountered in a high speed imaging system. It is also possible to embody the necessary data averaging in fixed integrated circuit format, however such an approach lacks the flexibility to change the averaging procedure "on-the-fly" to obtain different resolution capabilities that is often required in imaging systems. There is therefore a need for a digital signal processing system for an imager that is capable of rapidly and flexibly changing resolution capability.

SUMMARY OF THE INVENTION

In accordance with one aspect of the invention, therefore, there is provided digital signal processing apparatus for a digital scanner having an imager which generates a line of image pixel signals, the apparatus comprising means for converting the image pixel signals into image pixel digital data representative of individual imaging pixels in the imager and digital data accumulator means for selectively additively accumulating the digital image pixel data from selected imaging pixels. The apparatus further comprises means including a random access memory for supplying bit map operating control words, each of the words comprising programmably variable bit content defining pixel-by-pixel operating characteristics of the signal processing apparatus, the control words including accumulator control bits in each bit map determining on a pixel-by-pixel basis which image pixel digital data are to be accumulated. The apparatus also includes means for coupling the accumulator control bits to the accumulator to selectively control additive accumulation of the image pixel digital data on a pixel-by-pixel basis to create digital signal data values representative of predetermined blocks of imaging pixels in the imager.

In the method of the invention, image pixel signals from an imager that generates lines of image pixel signals are converted into image pixel digital data representative of individual imaging pixels in the imager. The digital image pixel data from selected imaging pixels are selectively additively accumulated in a digital data accumulator. The method further includes supplying and storing bit mapped operating control words each control word comprising programmably variable bit content defining pixel-by-pixel operating characteristics of the signal processing apparatus, the control words including accumulator control bits determining on a pixel-by-pixel basis which image pixel digital data are to be accumulated; and coupling the accumulator control words to the accumulator to selectively control additive accumulation of the image pixel digital data on a pixel-by-pixel basis to create digital signal data values representative of predetermined blocks of imaging pixels in the imager.

BRIEF DESCRIPTION OF THE DRAWINGS

In the drawings:

FIG. 2 is a timing diagram useful in explaining the operation of the apparatus of FIG. 1.

DETAILED DESCRIPTION OF THE INVENTION

Figure 1:
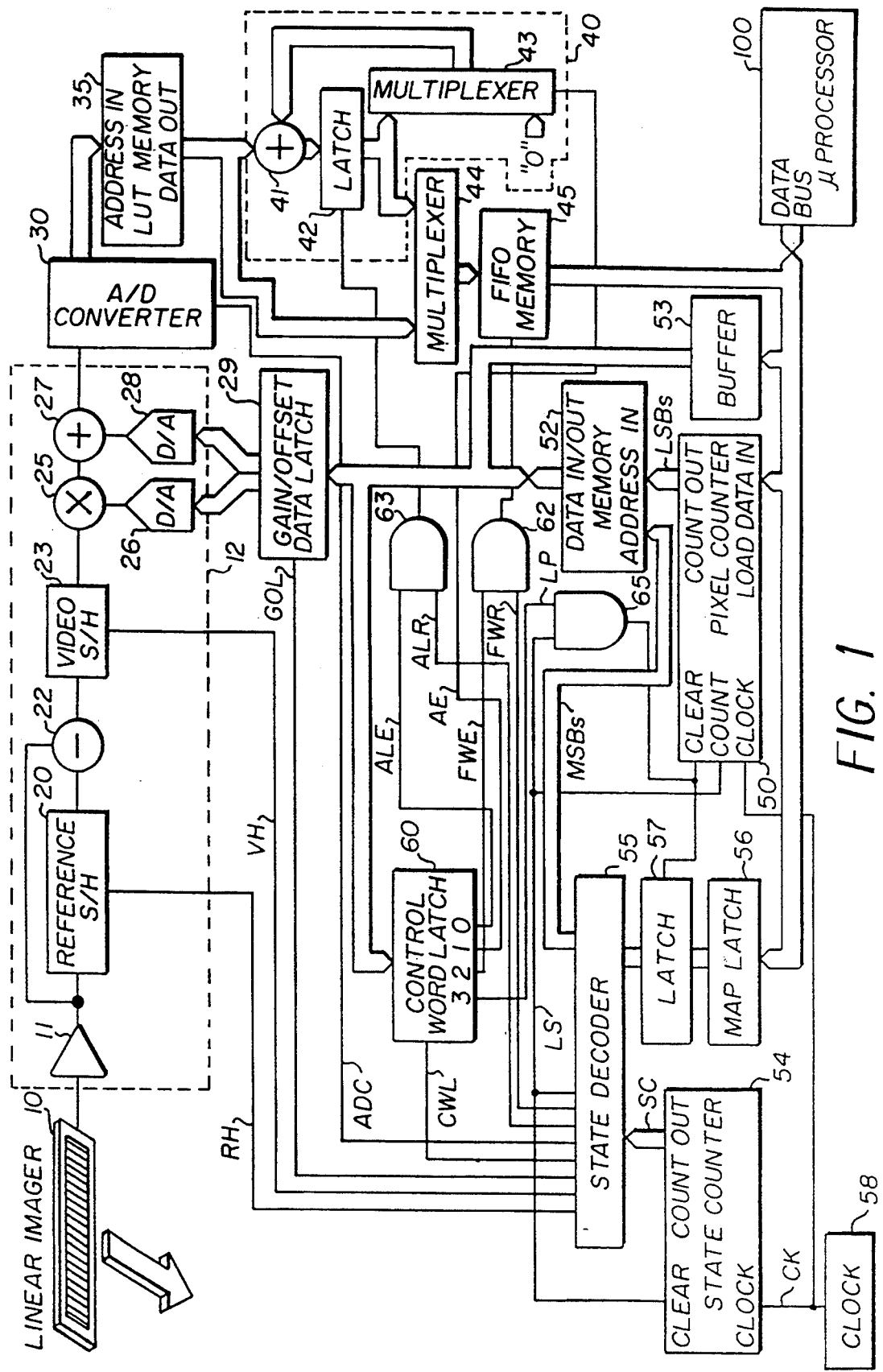
FIG. 1 is a block diagram of a film scanner system including digital signal processing apparatus of the present invention.

FIG. 1 shows an arrangement of circuit elements in the signal processing circuitry of a CCD based linear scanner. A linear CCD imaging device 10 integrates the charges produced by each imaging pixel in the CCD for a period of time and then transfers the charges to a shifting structure so that the charges can be shifted out of the CCD in a serial fashion. The signal produced by the CCD for each imaging pixel comprises two phases: a reference phase followed by a video phase. The reference phase provides a reference level against which the video phase that follows may be compared. The video phase represents the magnitude of charge accumulated at the imaging pixel. The serial signal coming from the CCD 10 is applied to an analog signal processor 12. In processor 12 the analog signal is amplified by amplifier 11, the output of which goes to a subtracter circuit 22 and a reference sample-and-hold circuit 20. The reference sample-and-hold 20 samples the signal from the CCD during each image pixel's reference phase. The subtracter 22 removes the sampled and held reference signal from the subsequent video phase. Hence, the output of the subtracter 22 is normalized to the reference level. This normalized signal is sampled by a video sample-and-hold circuit 23 during the video phase of the signal provided by the imager.

The sampled-and-held normalized video signal at the output of video S/H 23 is operated on by a multiplier circuit 25 and a summer circuit 27. These two circuits provide gain and offset compensation for variations in the video signal caused by such factors as variations in imaging pixel sensitivity, non uniformity of illumination, variations in signal offset and the like. The digital-to-analog converter 26 provides the gain correction value for multiplier 25 and the digital-to-analog converter 28 provides the offset correction value for summer 27. Data representing the offset and gain compensation values are provided to the two analog-to-digital converters 25 and 27 on a pixel-by-pixel basis with the arrival of the normalized video signal for each imaging pixel of CCD 10 by means of pixel counter 50, RAM memory 52, and gain/offset data latch 29. The pixel counter 50 increments synchronously with readout of the imaging pixel signals from the CCD 10. The output of pixel counter 50 is used to provide an address to memory 52 which holds gain and offset values for each imaging pixel. The gain and offset data output from the memory is latched by data latch 29 which provides the data to digital-to-analog (D/A) converters 26 and 28. A buffer circuit 53 allows a microprocessor 100 to gain access to memory 52 in order to change the gain and offset values as the result of a calibration process. The output of summer circuit 27 is coupled to analog-to-digital converter 30 wherein the normalized and gain/-offset-corrected video signal is converted to digital data representative of the image pixel signals from individual imaging pixels in the imager 10.

In the embodiment of FIG. 1, which is intended as a film scanner, the digital data from A/D converter 30 is applied to a lookup table (LUT) memory 35 where the density representative data is converted to log exposure data in known manner. From LUT memory 35 the converted digital data is applied via a data bus directly to a multiplexer 44 which is operative when activated by a multiplexer select signal (not shown) to apply the full resolution image pixel digital data directly to FIFO memory 45 from which the digital data is then available for readout and subsequent utilization by microprocessor 100. It will be appreciated that the single CCD output and related signal processing circuits as just described would provide a monochrome video signal. For a three color video signal, the CCD 10 would comprise three in-line CCD's each provided with a separate color filter, such as red, green and blue, and the outputs of each linear CCD would be coupled to separate processing circuits.

Timing of the various CCD and signal processing functions is determined by state control signals provided from state decoder 55. These state control signals are illustrated in FIG. 2 showing a sequence of twenty operating states occurring during the processing of each imaging pixel in CCD 10. Referring jointly to FIGS. 1 and 2, a clock signal CK from clock generator 58 causes state counter 54 to produce a sequential count data signal SC applied to the input of state decoder 55 which operates to decode the state count SC to produce the state control signals. The reference sample-and-hold operation is performed by the RH state signal during states 6–9 and the video sample-and-hold is performed by the VH state signal during states 16–19. The GOL state signal causes latching of the gain and offset data from memory 52 into data latch 29 during state 7. State control signal ADC enables analog-to-digital converter 30 to convert the analog image pixel signal during state 4 and the FIFO write raw (FWR) state control signal is applied to AND circuit 62 to allow writing of pixel data into FIFO memory 45 when enabled by a FIFO write enable (FWE) signal from control word latch 60. It will be appreciated that because of the serial nature of the signal processing, the illustrated state operations are not being performed on the same pixel data. For example, during a given pixel processing twenty state period, state signal GOL latches gain/offset data for pixel "n" which state signals RH and VH are currently sampling. State signal ADC causes A/D converter 30 to convert the previously sampled/compensated signal for pixel "n−1" and the enabled state signal FWR+FWE writes previously converted pixel data for pixel "n−1" from LUT memory 35 via multiplexer 44 into FIFO memory 45. As will be seen from the following description, when blocks of pixel signals are accumulated in accumulator 40 in accordance with the invention, the enabled FWR+FWE state signal writes accumulated data for pixel "n−2" from the accumulator 40 via multiplexer 44 into FIFO 45.

Having described in general terms the structure and operation of the CCD signal processing circuit of FIG. 1, there will now be described in more detail the digital signal processing apparatus of the present invention. Means for converting the image pixel signals from analog signal processing circuit 12 into image pixel digital data includes A/D converter 30 and the optional LUT memory 35. The circuits within dotted outline 40 comprise digital data accumulator means for selectively additively accumulating the digital image pixel data from predetermined blocks of imaging pixels within image 10. The accumulator 40 includes an adder circuit 41 to which the input digital data from LUT memory 35 is applied and a multiplexer 43 for adding back to the input digital data either the data at the output of the adder circuit or zero value, the selection of which is made by an accumulate enable (AE) control bit form control word latch 60. A latch 42 is provided to capture and hold the additive digital data value from adder circuit 41 under the control of a latch signal generated by the accumulate latch raw (ALR) state control signal and an accumulate latch enable (ALE) signal from control word latch 60.

The apparatus of the invention further includes means for supplying and storing bit map control words, each of which is comprised of programmably variable bit content defining pixel-by-pixel operating characteristics of the signal processing apparatus. The control words include, in accordance with a feature of the invention, accumulator control bits in each bit map (bit signal ALE and AE in the illustrated example) which determine, on a pixel-by-pixel basis, which image pixel digital data are to be accumulated in accumulator 40. As will be seen, for a CCD having a line of, for example, 530 imaging pixels, a bit map of 530 of these control words would be used to control the operation of the accumulator 40 for one entire scan line of the CCD. This supply and storage means principally includes microprocessor 100, pixel counter 50 and random access memory 52. The pixel counter 50 advances its count in response to the Last State (LS) signal from decoder 55 in synchronism with the processing of each imaging pixel in imager 10 to provide addressing data for storage and access of individual control words in memory 52 via the least significant bit lines LSB. To provide microprocessor 100 access to the memory 52, the pixel counter 50 is disabled from counting and an address is loaded directly into pixel counter 50 by microprocessor 100; then buffer 53 is enabled so that the microprocessor 100 can write data to memory 52 at the memory location specified by the address previously loaded into pixel counter 50.

In accordance with another feature of the invention, multiple bit maps are accomodated to allow for accumulating different blocks of image pixel data on a line-by-line basis. This is particularly useful if the digital signal processing apparatus of the invention is used in a film scanner which accomodates different film formats either within a single film strip or between different film strips. To provide for these multiple bit maps, two of the most significant bits (MSB) of the address data are provided from the microprocessor 100 to state decoder 55 via map latch 56 and latch 57 for use in selecting from within memory 52 the control word bit map to be used in controlling the operation of the CCD during generation of the next line of signal data in CCD 10. It is noted that the "last state" bit (LS) of the state control signal from state decoder 55 is used to advance the count of the pixel counter 50 and the combination of a "last pixel" (LP) signal from latch 60 with the "last state" signal (LS) is used to clear the pixel counter and latch the MSB address data for the bit map to be used in controlling the operation of the accumulator 40 (and the write to FIFO 45) during generation of the next line of signal data in CCD 10. It may be noted also that the state decoder 55 may provide alternative MSB map address information during certain states of each pixel in order to provide access to a table of gain/offset data values stored in memory 52. The output of pixel counter 50 provides the least significant bits LSB in the address information which serves to address the individual control words on a pixel-by-pixel basis for transfer to control word latch 60.

Means for coupling the accumulator control bits to the accumulator 40 includes control word latch 60 which is operative to selectively control additive accumulation of the image pixel digital data on a pixel-by-pixel basis to create digital signal data values representative of predetermined blocks of imaging pixels in the imager 10.

The architecture of a 4-bit control word used in the embodiment of FIG. 1 is set forth in Table I which summarizes the functions of the bits within the control word.

TABLE I

| Bit | Name | Function |
| --- | --- | --- |
| 0 | ALE | Accumulator Latch Enable-Latch digital output data from adder 41 |
| 1 | AE | Accumulate Enable-Allow previous pixel digital data from latch 42 to be added to next pixel digital data from LUT memory 35 |
| 2 | FWE | FIFO Write Enable-Allow FIFO write raw |

TABLE I-continued

| Bit | Name | Function |
| --- | --- | --- |
|  |  | signal FWR from state decoder 55 to write data into FIFO memory 45 from LUT memory 35 or accumulator 40 depending on the setting of multiplexer 44 |
| 3 | LP | Last Pixel-Reset pixel counter 50 when the last state signal LS is provided by state decoder 55 |

Considering now the operation of the apparatus of the invention, control word latch 60 receives operating control words from memory 52 which are outputted on a pixel-by-pixel basis to control the operation of the accumulator 40 in accordance with the bit content of each control word. The map of control words is stored in memory 52 at memory addresses corresponding to the pixel counts provided by pixel counter 50. Multiple maps of control words may be stored in memory 52. Appropriate map location address information is provided by two bit address code from microprocessor 100 stored in map latch 56. At the end of each processed line of pixel data from the CCD 10, the map address code in latch 56 is latched into latch 57 to provide part of the most significant bit MSB map address information via state decoder 55 to memory 52 which serves to select the control word map for use in the next line of imager processing. The output of pixel counter 50 provides the least significant bits LSB in the address information which serves to address the individual control words on a pixel-by-pixel basis for transfer to control word latch 60.

Table II, below, presents an example control word map based on the bit functions from Table I. In the timing of state decoder outputs as shown in FIG. 2, each successive control word is latched by state control signal (CWL) at the end of each pixel time; hence, the control word for a given pixel count actually takes effect during the next pixel. Additionally, since the signal for a given pixel is actually A/D converted during the next pixel time, writing the given pixel's data to the FIFO memory should take place after conversion is complete in the next pixel as previously explained. Noting these latencies and pipeline effects, a description of the example control word map can be provided.

TABLE II

| Pixel Counter | Control Word Bits 3210 | Pixel Type | Line Events |
| --- | --- | --- | --- |
| 0 | 0000 | Test & dummy | adder latch disabled; mux 43 set to input 0 value to adder 41 |
| 1 | 0000 | Test & dummy |  |
| 2 | 0000 | Test & dummy |  |
| ... | ... | ... | ... |
| 10 | 0001 | Test & dummy |  |
| 11 | 0011 | Imaging | latch 42 enabled; latch pixel 10 data |
| 12 | 0011 | " | mux 43 set to input latch data to adder; latch pixel 10+11 data |
| 13 | 0011 | " | latch pixel 10+11+12 data |
| ... | ... | ... | ... |
| 19 | 0011 | " | latch pixel 10 thru 18 data |
| 20 | 0101 | " | latch pixel 10 thru 19 data |
| 21 | 0011 | " | write latch data to FIFO; mux set to input 0 value to adder; latch pixel 20 data |
| 22 | 0011 | " | write to FIFO disabled; mux set to input latch data to adder; latch pixel 20+21 data |

TABLE II-continued

| Pixel Counter | Control Word Bits 3210 | Pixel Type | Line Events |
|---|---|---|---|
| 23 | 0011 | " | latch pixel 20+21+22 data |
| ... | ... | ... | ... |
| 29 | 0011 | " | latch pixel 20 thru 28 data |
| 30 | 0101 | " | latch pixel 20 thru 29 data |
| 31 | 0011 | " | write latch data to FIFO; mux set to input 0 value to adder; latch pixel 30 data |
| 32 | 0011 | " | write to FIFO disabled; mux set to input latch data to adder; latch pixel 30+31 data |
| ... | ... | ... |  |
| 489 | 0011 | " | latch pixel 480 thru 488 data |
| 490 | 0100 | " | latch pixel 480 thru 489 data |
| 491 | 0000 | Test & dummy | write latch data to FIFO; mux set to input 0 value to adder; adder latch disabled |
| 492 | 0000 | Test & dummy | write to FIFO disabled |
| ... | ... | ... | ... |
| 502 | 1000 | Test & dummy |  |
| 503 | 0000 | Test & dummy | reset pixel counter |

In the example control word map in Table II, the first ten pixels (pixel counts 0–9) of the linear imager are test or dummy pixels and are ignored for purposes of the present description. During processing of these pixels, the adder latch 42 is disabled by control word bit 0 (ALE) and the multiplexer 43 is set by control word bit 1 (AE) to input a 0 value to adder 41. The next 480 pixels (pixel counts 10–489) are actual imaging pixels. During operating state 19 at the end of processing of pixel 10, the pixel 10 control word, with bit 0 (ALE) set, is latched into control word latch 60 in preparation for processing during pixel 11. During pixel 11 processing, the multiplexer 43 is still set by the low AE bit to input a 0 value to adder 41. During operating state 18 (FIG. 2), the adder latch 42 is enabled by the setting of ALE bit 0 to latch the pixel 10 digital value supplied from LUT memory 35 to adder 41. Note that the signal from pixel 10 is converted to a digital value by A/D converter 30 during pixel 11 processing. The write to FIFO bit 2 (FWE) is low thus preventing the writing of the latch 42 data to FIFO.

During operating state 19 at the end of processing of pixel 11, the pixel 11 control word, with both the ALE and AE bits set, is latched in latch 60 in preparation for pixel 12 processing. The setting of the AE bit 1 causes the multiplexer 43 to input the pixel 10 digital data from adder latch 42 into one input side of the adder 41 to be added (accumulated) to the digital data value of pixel 11 arriving from LUT memory 35. Thus during operating state 19, the accumulated value of pixel 10+11 is latched into adder latch 42. The same operation continues for each of the ensuing pixels until, at the end of pixel 20, the accumulated value of ten pixels (10–19) resides in latch 42. The pixel 20 control word, with the FWE bit 3 set and the AE bit 1 low, is latched into latch 60. The low AE bit disables the accumulation function during processing of pixel 21. During state 17 of pixel 21, the contents of adder latch 42 are written to FIFO memory 45 for further processing by microprocessor 100. Since the written value is the summation of the ten pixel values, microprocessor 100 would typically perform a divide-by-10 calculation to arrive at the average value for the ten pixels. After writing of the accumulated value to FIFO memory, control word bit ALE enables the latching of the digital value for pixel 20 into adder latch 42 during state 18 to restart the accumulation process for the next ten pixels. This process is repeated for each block of ten imaging pixels until, control words applicable to dummy/test pixels 492 thru 503, with all bits low, are latched into latch 60 thus ending the accumulation process. The exception is in the control word latched at the end of pixel 502 and used during pixel 503 in which the Last Pixel (LP) bit 3 is set to reset the pixel counter 50 to start a new line of image signal processing.

In the preferred embodiment shown in FIG. 1, there is a map latch 56 to which the microprocessor 100 can write two bits. These two bits are subsequently latched by latch 57 at the end of a line and provided to the state decoder 55 for incorporation into the MSB's sent to the memory 52 which contains the control word map. This allows the microprocessor to select from among a plurality of different control word maps in the memory 52. The number of available bit maps is determined by the size of the memory. The latch 57 is updated at the end of the line by the output of AND gate 65 which occurs during the joint occurence of the Last State (LS) and Last Pixel (LP) signals so that transition from one control word map to another occurs at a known point in the control word map, namely at a pixel count of 0. This ability to change control word maps "on the fly" without significant additional circuit complexity provides significant benefits. It may be desired, for example, to change the number of imaging pixels to be used for imaging purposes, as when the imager is used to scan photographic film with some film frames of normal format width and some frames of narrower panoramic format width. This is accomplished by changing the pixels at which the accumulation process is started and stopped. Similarly, it may be desired to change the imaging resolution by varying the size of pixel blocks accumulated between writes to FIFO. The map latch 56 and latch 57 permit the flexible selection among appropriate stored control word bit maps for operation of these useful features.

The memory containing the control words may be an erasable programmable read only memory (EPROM)

which could be removed and reprogrammed to allow different arrangements of control bits, or the memory could be a read/write memory so that the control bits could be changed in the system. This latter arrangement would be preferable to allow the accumulation operation to be changed in real time.

The invention has been described with reference to a preferred embodiment. However, it will be appreciated that variations and modifications can be effected by a person of ordinary skill in the art without departing from the scope of the invention.

PARTS LIST 10 linear CCD imager
11 amplifier
12 analog signal processor
20 reference sample-and-hold
22 subtractor circuit
23 video sample-and-hold
25 multiplier circuit
26 gain D/A converter
27 adder circuit
28 offset D/A converter
29 gain/offset data latch
30 video signal A/D converter
35 LUT memory
40 accumulator circuit
41 adder circuit
42 adder latch
43 accumulator multiplexer
44 multiplexer
45 FIFO memory
50 pixel counter
52 memory
53 buffer
54 state counter
55 state decoder
56 map latch
57 latch
58 clock
60 control word latch
62 AND gate
63 AND gate
65 AND gate
100 microprocessor

What is claimed is:

1. Digital signal processing apparatus for a digital scanner having an imager which generates a line of image pixel signals comprising:
    means for converting said image pixel signals into image pixel digital data representative of individual imaging pixels in the imager;
    digital data accumulator means for selectively additively accumulating the digital image pixel data from selected imaging pixels;
    means including a random access memory for supplying bit map operating control words, each of said words comprising programmably variable bit content defining pixel-by-pixel operating characteristics of said signal processing apparatus, said control words including accumulator control bits in each bit map determining on a pixel-by-pixel basis which image pixel digital data are to be accumulated; and
    means for coupling said accumulator control bits to said accumulator to selectively control additive accumulation of the image pixel digital data on a pixel-by-pixel basis to create digital signal data values representative of predetermined blocks of imaging pixels in the imager.

2. The signal processing apparatus of claim 1 in which said means for supplying bit map control words stores and supplies a plurality of maps of control words respectively including different sets of accumulator control bits defining different blocks of image pixel digital data to be accumulated and the apparatus further includes means for selecting one of said bit maps at the conclusion of processing of a line of digital data which is different from the bit map employed for processing the line of digital data just concluded.

3. Signal processing apparatus of claim 1 wherein said means for supplying bit map control words includes an imaging pixel counter.

4. A method of processing image pixel signals from a an imager that generates lines of image pixel signals, the method comprising:
    converting said image pixel signals into image pixel digital data representative of individual imaging pixels in the imager;
    selectively additively accumulating the digital image pixel data from selected imaging pixels in a digital data accumulator;
    supplying and storing bit mapped operating control words, each of the control words comprising programmably variable bit content defining pixel-by-pixel operating characteristics of said signal processing apparatus, said control words including accumulator control bits determining on a pixel-by-pixel basis which image pixel digital data are to be accumulated; and
    coupling said accumulator control words to said accumulator to selectively control additive accumulation of the image pixel digital data on a pixel-by-pixel basis to create digital signal data values representative of predetermined blocks of imaging pixels in the imager.

5. The method of claim 4 wherein a plurality of bit maps of control words respectively having different accumulator control bits are stored and supplied to correspondingly define different predetermined blocks of imaging pixels to be accumulated.

* * * * *